United States Patent Office 2,892,601
Patented June 30, 1959

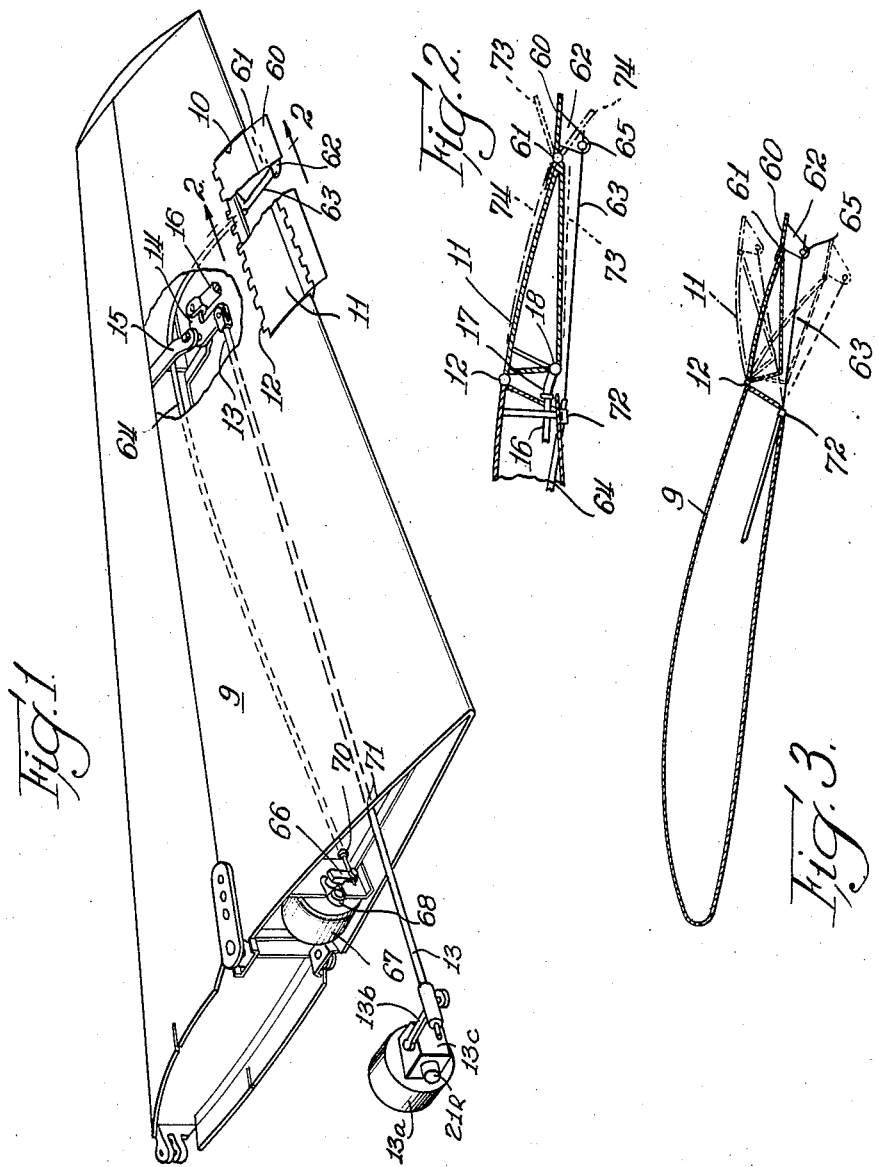

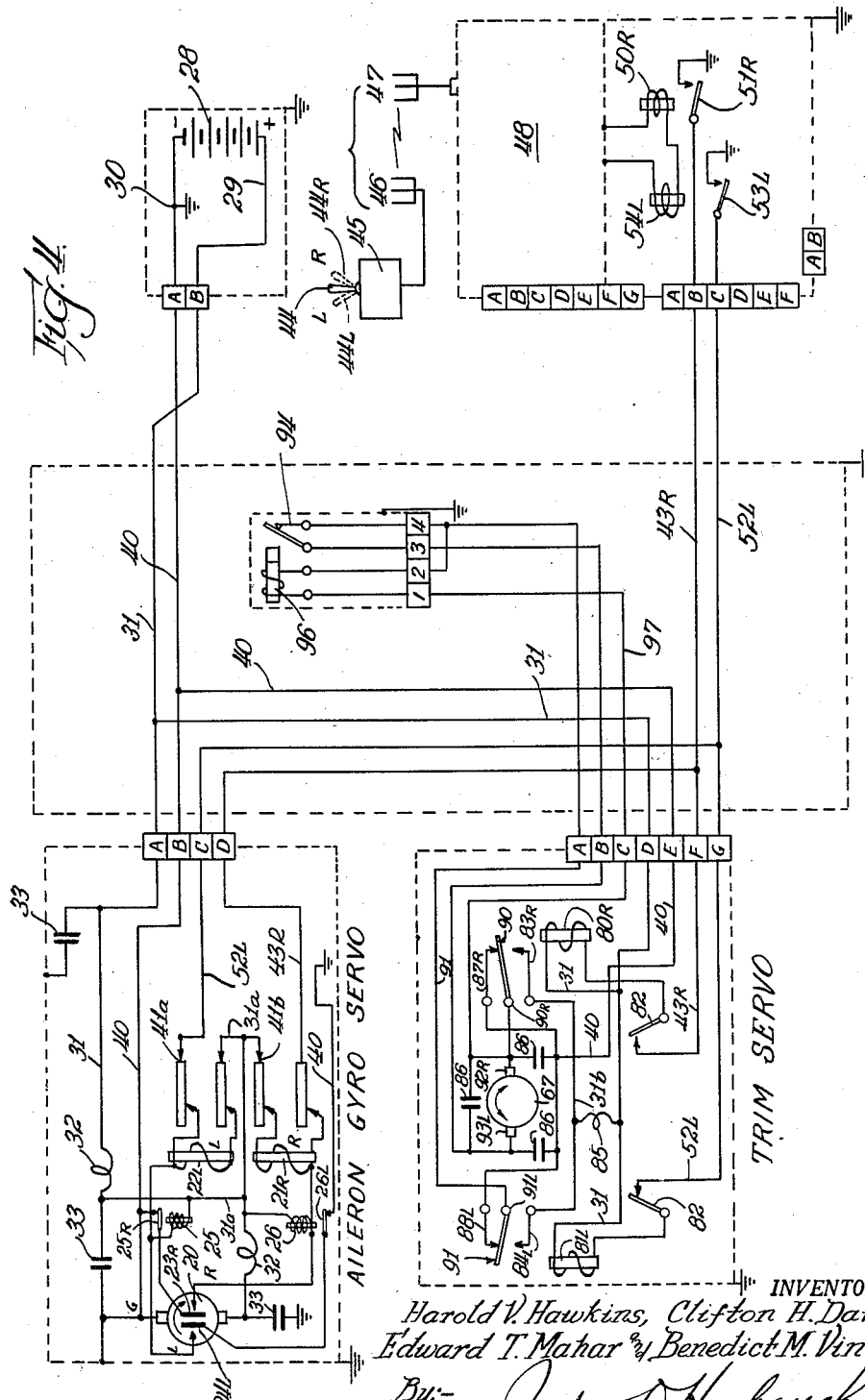

2,892,601
AIRCRAFT CONTROL APPARATUS

Harold V. Hawkins, Chicago, and Clifton H. Davis, Joliet, Ill., and Edward T. Mahar, Oxnard, Calif., and Benedict M. Vinicky, Joliet, Ill.

Application August 12, 1952, Serial No. 303,852

10 Claims. (Cl. 244—77)

The present invention relates generally to aircraft and particularly to an improved method and apparatus by which an aircraft can be controlled and trimmed automatically and from a point remote from the aircraft.

Although the invention may be of relatively extensive utility in the field of maintaining normal level flight of an aircraft, the particular value and use as conceived and described herein in its preferred form is in the control and operation of a drone aircraft used as a target for antiaircraft gunnery practice.

In aircraft embodying the invention it is preferred to bank and turn the ship by tilting or rolling it essentially by means of aileron movement accomplished by electrical prime movers operating the ailerons under radio command signal through an electrical and mechanical actuating and control system of elements, and when no command is imposed have the ailerons free to stream with the wings. With such an arrangement, however, if there is any unbalance present or developed in flight, for instance, as between the lift effects of the two wings, the aircraft may gradually roll or list and go into a bank and turn without command. Heretofore, the conventional way for a pilot remote from the plane to right such a ship having a listing tendency would be to counter by operating the ailerons with opposite command signals as often as the ship lists.

Under such appropriate command signals the ailerons are moved by the control system from their streaming position and, as long as the signal is sustained, their angle is progressively increased with respect to the wings to vary the composite angle of attack of the wings. This temporary change in the angle of attack of the wings unbalances the wings in the opposite direction and brings the ship back to level flight. Thereupon, the signal is terminated by the pilot and the ailerons released to stream with the wings again. However, when the ailerons are released the ship will gradually resume its previous listing. Consequently, it becomes necessary for the pilot to command the target repeatedly from time to time with corrective control signals to approximate level flight. This repeated listing and recovery results in the craft sailing an unnatural and unsatisfactory course.

One of the objects of the present invention is to eliminate the need for direct aileron control for righting a listing ship yet capitalize upon the pilot's normal use of ailerons for this purpose to gradually trim the ship.

Another object of the invention is to trim the ship automatically and gradually by automatically acquiring successive increments of trim for the ship each time a command signal for aileron movement is utilized to right a ship having a listing tendency.

A further object of the invention is to utilize the ailerons in their streaming position to correct for any flight unbalance.

The invention is also characterized by a trim control which initially assists the aileron bank control to perform its function in rolling the ship and then return to its trim attitude when the ship is brought out of its bank.

Another object of the invention resides in operating the ailerons for bank and turn, and the trim of the ship, by the same signal.

Another object of the invention resides in altering the trim of a ship to list the ship in the direction of the bank and turn as a part of the direct operation of the ailerons for accomplishing a sustained bank and turn in that direction.

Another object of the invention is to trim a ship for a level flight attitude independently of aileron control during straightaway flight and alter the trim favorably to the dominant aileron control during banking and turning, thereafter returning the plane to its normal level flight attitude with its previous trim restored when righting the ship from a bank and turn.

Another object of the invention is concerned with a gyro controlled ship having a normal righting tendency, to alter the trim of the ship enough during the bank and turn to counterbalance appreciably the normal righting tendency of the ship for accomplishing a sustained bank and turn.

The invention is also characterized by a relationship of cooperating parts in which the duration of a signal is the increment which determines whether or not the ship will be brought into a predetermined trim attitude or a temporary level flight unbalance for purposes of bank and turn performance.

The invention is also characterized by a single control stick type of control for both flying and trimming the ship.

A further object of the invention is to provide a trimming device for aircraft which is controlled from a point remote from the aircraft especially while it is being launched or is taking off as well as while the aircraft is in flight.

Another object of the invention resides in the ability of the aircraft as a target, upon serious damage to it which results in a heavy listing tendency, to be righted by the aileron and trim controls operating simultaneously with like effects as an emergency measure while at the same time with each use of them for that purpose automatically trimming the ship as a more gradual process performed over a period of several seconds.

A further object of the invention is to maintain a predetermined streaming attitude between the wing surface and the trim surface independently of the position of the ailerons yet cause the ailerons to stream in accordance with the attitude of the trim surface.

Still a further object of the invention is to provide an apparatus of the class described which is easy to build, service and operate and simple to understand and operate under any and all service and flight conditions.

These being among the objects of the invention, other and further objects will become apparent to those skilled in the art from the drawings, the description relating thereto and the appended claims.

In the drawings:

Fig. 1 is a perspective view of an aircraft wing detached from a fuselage and shown partly in section illustrating the preferred embodiment of the invention.

Fig. 2 is an enlarged section taken upon line 2—2 of Fig. 1.

Fig. 3 is a diagrammatical representation of a section through the wing at the aileron showing the range and relative movement of the cooperating parts having airfoils, and Fig. 4 is a schematic electrical diagram of the electrical equipment embodied in the invention.

Although the present invention will operate quite successfully with an intermittently energized or reversible aileron motor it is preferred that the ailerons be powered selectively through either one of two clutches either magnetically or mechanically energized from a "gyro servo" motor which is running constantly, one clutch transmitting power to move the ailerons to roll the ship in one direction and the other clutch to move the ailerons in the opposite direction.

When magnetic clutches are used, each magnetic clutch is controlled selectively through operation of either one of two switches connected in parallel. One switch of each set of said two switches is closed selectively by the gyro itself when the gyroscopic effect of the gyro opposes any persistent change or a rate of motion change from a preceding position occurring in the attitude of the ship. It is through these switches that the gyro servo endeavors to maintain that attitude of the ship which existed immediately prior to the time that the change began to take place.

The other switch of each set of said two switches is closed selectively at the will of the pilot by the output of a radio receiver depending upon which one of two different broadcast frequencies carries a "beep" or command signal broadcast to the ship by the pilot.

A trim tab is hinged at the trailing edge of one of the ailerons where it is controlled in its attitude through a self-locking drive powered by a reversible trim prime mover or actuator which is normally unenergized. Two motor reversing relay switches control the energization and direction of rotation of the trim actuator depending upon the same radio "beeps" which control the magnetic clutches. Preferably in the common lead or "ground" return of the two circuits which include the last two switches, is located a time delay relay which interrupts actuation of the trim servo actuator after a fraction of a second of duration of each "beep."

Thus, upon reception of a "beep" of substantial duration, the trim actuator is momentarily energized at the beginning of the "beep" in either one of two directions depending on the frequency upon which the "beep" is received, and the associated aileron gyro servo clutch is energized for the duration of the "beep" to provide a cooperative relationship between the aileron and trim tab, both as to function and results.

The construction and relationship of cooperating parts embodying the invention are shown in the drawings as related to a low-wing monoplane having a dihedral angle of approximately 2° as read along the top of the wing spars. A wing panel 9 which happens to be the right wing of an aircraft is illustrated in perspective as detached from the fuselage (not shown) so that the relative arrangement and operation of the respective parts may be observed more clearly.

On the trailing edge of the wing near its tip a notch or well 10 is provided to receive an aileron 11 within the contour of the wing as pivotally mounted there by hinge element 12 disposed at the level of the upper surface of the wing. A corresponding aileron (not shown) is mounted in the other wing in a similar position symmetrical to the first and the two ailerons are so interconnected by a mechanical linkage 13 as to be moved thereby in opposite directions simultaneously about their hinge axes.

L-shaped lever arms 14 pivoted on rigid brackets 15 are employed to translate the movement of the linkage 13 in a direction crosswise of the ship to a movement lengthwise of the ship for the control rod assemblies 16 that are attached to the ailerons. The linkage 13 is operatively connected to a motor 13a (not shown) desirably located in the fuselage of the plane. The motor 13a is shown in Fig. 4 in operative relation to its control components. In the preferred form of the invention, the motor 13a operates constantly and power is transmitted to the linkage 13 by selective energization of one of two magnetic clutches 21R and 22L which are operatively connected to the linkage 13 of the right wing and left wing respectively. Preferably each control rod includes a turn-buckle assembly 17 that is adjustable to normalize the ailerons in their correct streaming position in both wings and the linkage 13 is driven by a lever 13b actuated by the clutches 22L and 21R carried by the gear housing 13c on a motor 13a. Each control rod assembly 16 is pivoted at its end 18 to the lower leading edge of the aileron to provide the greatest leverage on the aileron in moving it about the hinge axis 12 for raising and lowering the aileron to its alternate full throw positions as shown in broken lines in Fig. 3.

The ailerons are normally free of any restraint other than that under which they work in unison, the purpose of this being to permit the ailerons to stream with the wings when no control is imposed upon them. This position of the ailerons is hereafter referred to as their "rig position."

Assuming that the aircraft is in level flight with the ailerons in rig position and the wings delivering a balanced lift, the ship will tend to maintain a straight and stabilized upright or level flight. When, however, it is desired to bank and turn the ship the linkage 13 will be actuated to force the aileron 11 upwardly or downwardly depending on the direction of the turn desired and the aileron upon the opposite wing will be forced in the opposite direction.

If the aileron shown in Fig. 1 is forced upwardly this will tend to decrease the angle of the attack of that portion of the wing and thus reduces the lift of the wing and causes it to drop while the aileron on the other wing being forced downwardly increases the angle of the attack of that wing and increases its lift to cause it to rise. The resulting composite effect of relative wing lifts will cause the ship to bank and turn to the right with a continuing rolling action until the aileron control is released. Whereupon, the ailerons again stream with the wings leaving the ship in the attitude imposed upon it immediately preceding the release of the control.

In event, however, it is desired to right the ship or bring it quickly out of the bank and turn, the ailerons are moved from their rig position in a direction opposite to their previous movement. Then when the level flight attitude of the ship is recovered, the aileron control is again released to permit the ailerons to stream with the wings and permit the ship to fly level and straight.

Although this operation for the ailerons can be had by intermittent energization of a reversible motor as commanded by radio signal through a suitable amplifier, it is preferred to employ a gyro servo motor which is constantly running and provide magnetic clutches to derive power from the gyro servo to pull or push the linkage 13. In this connection when a gyro servo motor is employed it is also possible to energize the clutches appropriately and automatically through switches which are closed when the attitude of the ship changes and the change is bodily opposed gyroscopically.

With such an arrangement the gyro will operate to "tickle" the ailerons from time to time to resist roll change from a predetermined flight attitude. But the gyro can be overrun by an overriding force of the ailerons in the bank and turn when either clutch is held closed long enough to change the attitude of the ship. Then, when the clutches are released and the ailerons stream, the gyro servo having been brought to a new position endeavors to maintain its new position and in doing so will take over the operation of the gyro switches to control the clutches to keep the ship in the ship's new position.

The gyro servo is indicated diagrammatically in Fig. 4 at 20, the right bank clutch at 21R, the left band clutch at 22L, the right turn gyro servo switch at 23R, the left turn gyro switch at 24L, a right turn interruptance relay switch at 25R which is opened by the simultaneous energization of its solenoid 25 with the solenoid of the left turn clutch 22L, and a left turn interruptance switch 26L opened by the simultaneous energization of its solenoid 26 with the solenoid of the right turn clutch 21R.

These switches are connected in circuits as follows: A source of direct current such as a battery 28 has the negative side grounded as at 30 with a negative line 40 connected thereto and leading to the several components. The positive line is identified as 31 throughout all the circuits with suitable suffix letters to indicate by "R" or "L" with which turn "right" or "left" they are identified. One branch includes choke coils 32 along with condensers 33 to reduce radio interference. The gyro servo motor 20 is connected to the battery through circuit 31A and the choke coils 32 to the "positive" line 31 on one side, and directly to the "ground" by the line 40 on the other side. When this circuit is closed as by connecting the battery leads at the time the aircraft is prepared to take off, the gyro servo motor is brought up to speed to perform its gyroscopic function as already described.

The solenoids of the magnetic clutches 21R and 22L are powered from the positive line 31A through suitable running contacts or brushes indicated at 41A and 41B, respectively, with the relays 26 and 25 connected in parallel therewith, respectively, but directly to the positive line 31A. The other side of the solenoids may be closed to "ground" to complete the circuit in one of two ways, either through the switches 23R and 24L controlled by the gyroscopic action of the gyro servo, or through the radio controlled turn circuits 43R and 52L which are selectively closed to ground when a command signal is broadcast over either one of two frequencies.

The broadcast of such command signals is controlled by the pilot control stick 44 mounted on a radio broadcasting set 45. The signals are sent from the sending antenna 46 to the receiving antenna 47 and amplified in the receiver 48 to power either the solenoid 50R or solenoid 54L to close either switch 51R or switch 53L, respectively, when a signal is broadcast.

It will be appreciated, however, that when the ailerons are being operated under a command signal from the radio broadcasting set the attitude of the plane is being changed by aileron force overriding that of the gyroscopic control. However, the gyroscopic opposition to such change will operate to close whichever one of the switches 24L or 23R that would normally be closed to hold the ship against change. In order to prevent the other clutch being actuated thereby while a command signal is in existence, the cut-out relay switches 25R and 26L are subjected to energization as already described in association with the solenoids of the magnetic clutches 22L and 21R, respectively.

For instance, if the control stick 44 is manually deflected to the "right turn" position shown in broken lines 44R, thereby indicating the desire of the pilot to put the plane in a right bank and turn, a "beep" signal of a duration generally not to exceed one second will be broadcasted by the radio broadcasting set 45 to the radio receiving set 48. This signal is amplified to energize the solenoid 50R. This closes the switch 51R and operates to energize any device located between that switch and the positive pole 29 of the battery 28. The particular circuit shown includes the lead 43R, the magnetic clutch 21R, contact 41b, the lead 31a and the lead 31 connected to the positive side 29 of the battery 28. Thus, the magnetic clutch 21R is energized and with it the normally closed switch 26L is opened to render ineffective any closure of the 24L switch by the gyro servo motor. Thereafter the clutch 21R receiving the drive from the gyro servo 20 will operate the linkage 13 to raise the aileron 11 on the right wing and lower the corresponding aileron on the left wing to cause the ship to go into a right-hand roll with which a right-hand bank and turn is accomplished.

Upon release of the control stick 44 from its position 44R the signal is stopped, the switch 51R opens, the clutch 21R disengages and the ailerons are permitted to stream with the wings. The de-energization of the magnetic clutch 21R permits the switch 26L to close again and therewith the ship is returned to the control of the gyro servo. Thereafter, if the ship has a self-righting tendency the righting tendency will cause the gyro servo to close the switch 23R, again energizing the right bank magnetic clutch 21R in an endeavor to maintain the ship in the attitude which existed at the time the command control was terminated. Thus, the gyro servo tends to fly the ship in a continuous bank and turn attitude imposed upon the ship by the command control.

However, when it is desired to right the ship quickly, the control stick 44 is deflected to the left position indicated by the broken lines 44L in which position the broadcasting set 45 broadcasts a like "beep" signal over another frequency which results in the energization of the solenoid 54L to close the switch 53L. Closure of this switch powers any electrical devices between it and the positive side 29 of battery 28. This includes the magnetic clutch 22L through the leads 31a and 31. Energization of the magnetic clutch 22L establishes a drive between the gyro servo motor and the linkage 13 to lower the aileron 11 on the right-hand wing 9 and raise the other aileron on the other wing to cause the ship to go into a left-hand roll that brings it back to level flight. If the signal is sustained by the continued holding of the control stick 44 in its left-hand position the ship will pass its level flight attitude and go into a left-hand roll or list which causes it to bank and turn in a left-hand direction.

Thus, a pilot remote from the ship can control the flying attitude and the performance of the ship in the air by mere operation of the control stick 44 either to the right or left depending upon the performance desired of the ship.

The above description is made with the presumption that the ship is perfectly balanced in its rig condition. If the ship is unbalanced, for example, with a left wing heavy tendency, then it becomes necessary for the pilot to repeatedly control the ship with right-hand command signals to maintain level flight. Every time that the pilot gives a right bank signal the aileron on the right wing moves up tending to decrease the angle of attack of that portion of the wing thus reducing the lift and causing the right wing to drop. Under such condition it would be necessary for the pilot to repeatedly perform this type of control function, and the opposite would be true if the right wing had a heavy tendency. The invention automatically provides an accumulation of trim increments with such repeated performance of the pilot to trim the ship gradually and eliminate the need for sustained repetitious control functions.

Referring now to Figs. 1, 2 and 3, a trim tab 60 is pivotally mounted as at 61 to the trailing edge of the aileron 11. The tab 60 is provided with a depending ear 62 that receives one end of the wire portion 63 of a linkage 64 adjustably at its lower end in a screw clamp 65. The wire 63 in turn is driven by a crank arm 66 operated in opposite directions by a reversible motor 67 through a transmission 68. The housing of the wire is secured at one end at 70 to a wing rib 71 and at the other end by a clamp 72 below the lower face of the wing just in front of the aileron notch or well 10. Thus, the tab 60 is under the control of the reversible trim actuating mechanism 67 and 68, and being connected directly to the wing by the wire portion of the linkage, its airfoil effect is directly related to the wing itself with its streaming position or attitude independent of the movement of the aileron 11 as shown in Fig. 3 due in part to a parallelogram relationship of four support and control points, as between the pivotal axes 12 and 61 and the location of the clamp 72 and the fastening point 65 of the wire portion on the trim tab (Figs. 2 and 3).

Thus, when the crank 66 is moved by the trim mechanism in a counter-clockwise direction the trim tab is moved to the position indicated in broken line 73 in Fig. 2. On the other hand, if the crank 66 is moved in clockwise direction the trim tab 60 is moved to the broken line position indicated at 74 in Fig. 2.

However, in view of the fact that the ailerons are free to stream with the winds and also to accommodate any relative change between the tab 60 and the aileron 11, it will be appreciated that movement of the tab 60 in either direction will cause the ailerons to seek a new balance point or new stream relationship with respect to the wings. With the ailerons thus constrained to find a new position which is not identical to their rig position, a corresponding aerodynamic adjustment will result in which the trim tab in cooperation with the ailerons can be employed to correct or impose listing tendencies in a ship to balance or unbalance it with regard to a level flight attitude.

The trim actuator 67, 68 is operated from the same radio command signals as the magnetic clutches by and with the assistance of polarity switches and solenoids to drive the motor 67 and crank 66 in one direction with one signal and drive them in the opposite direction with the other signal.

The circuits for accomplishing this include two solenoids 80R and 81L connected in common upon one side to the positive power line 31 and connected separately on the other side to the ground or circuit closing leads 43R and 52L, respectively, that are under the control of the switches 51R and 53L, respectively, already described. Switches 82 are rotary limit switches provided in these circuits to prevent damage to the trim tab and to limit adjustably the range of its movement.

Single pole double throw relay switches 90 and 91 are operated by the solenoids 80R and 81L, respectively, with the positive side 29 of the battery 28 connected by lead 31b through an interference suppressing choke coil 85 to the poles of the normally open switches 83R and 84L. The normally closed switches 87R and 88L are connected together and to the ground wire 40. The center poles having switch elements 90R and 91L thereon are connected to the leads 92R and 93L of the motor 67.

In the preferred embodiment illustrated a normally closed time delay relay switch 94 is connected in the circuit between the motor lead 93L and the switch pole 91L. This switch is operated by a solenoid 96 connected between the switch poles 90R and 91L to be energized simultaneously with the start of the motor 67 through leads 91 and 97, respectively.

Thus, when the relay 80R is energized by the closure of switch 51R the switch element 90 closes against the contact 83R to energize the motor with a predetermined current polarity in which the positive wire 31B is connected to the motor lead 92R with the other motor lead 93L connected to the ground wire 40 through the normally closed swiches 94 and 88L. This polarity arrangement will cause the motor to rotate in a predetermined direction.

However, when it is desired to rotate the motor in the opposite direction for purposes already mentioned the solenoid 81L is energized by the closure of the switch 53L to close the switch element against the contact 84L thereby energizing the motor with reverse current polarity in which the positive wire 31B is connected through the normally closed switch 94 to the motor lead 93L with the other lead of the motor 92R connected to the ground wire 40 through the normally closed switch 90 and lead 87R.

Thus, it will be noted that when the switch 51R is closed two things happen, namely, the right-hand clutch mechanism 21R is brought into operation to raise the aileron 11 and thereby roll the plane into a right-hand bank and turn. The other thing which happens is that the trim servo will be operated to drop the trim tab in the opposite direction. With the aileron moved up and the trim tab moved down, two results are obtained, one, the tab imposes a list tendency on the ship and assists the aileron in performing its control function, and, two, with an aircraft having a normal righting tendency, once the new attitude of the aircraft is attained and the aileron released to stream, the list tendency of the tab which remains tends to hold the aircraft in its newly assumed attitude in opposition to the tendency of the aircraft to right itself, thus, assisting the gyro servo in maintaining the newly acquired attitude of the aircraft in the bank and turn.

Then when it becomes necessary or desirable to right the aircraft for level flight, or bank it in the opposite direction, the other switch 53L is closed by radio command signal and the right aileron is forced down with the trim tab lifted by one and the same signal. This brings the aircraft back to its level flight and restores the original trim of the trim tab.

In this connection it is to be noted that the relay 96 and switch 94 comprise a normally closed slow-breaking copper-jacket relay preferably having a delayed break of .0125 second. Thus, each time a pulse is transmitted through the radio the trim actuator receives current for .0125 of a second. If the pulse lasts longer the aileron gyro servo continues operation after the trim servo stops. It will be appreciated, that the relative relation of length of time, area of trim tab and speed of the trim actuator can be varied to obtain the results desired and from aircraft to aircraft as required.

Consequently, a pilot can place the ship in trim with repeated pulses. The ability of the ailerons to stream permits this. Moreover, by using the same control stick and holding it for a period of time long enough to bank and turn the ship the trim actuator will be pulsed only once to provide a predetermined increment of trim yet the aileron servo will operate the ailerons to provide an aileron movement proportional to the length of time of the signal and cause the target to bank and turn accordingly. This has a particular advantage in that without disturbing the normal actions of a pilot, he will automatically acquire an increment of permanent trim, knowingly or unknowingly, each time he has to right the ship with aileron movement and ultimately will have the ship in trim without further need of aileron movement to right or hold the ship in balance. This is done without interfering with normal aileron handling. In fact, in the preferred embodiment the trim tab is mounted upon the right aileron and both motors are so hooked up that the initial pulse actuates the trim actuator in the direction assisting the aileron to move in the direction it is driven by the aileron servo.

For example, in operation, if the pilot desires to lower the right wing to make a right turn the right aileron has to be raised. In doing this, a pulse will be sent over the right turn radio frequency and the trim actuator will operate to lower the trim tab a predetermined angle and the relay 96 will terminate further movement on that pulse. With this slight adjustment being made the aileron will acquire a new streamline characteristic that is upward slightly in its adjusted position and the aileron gyro clutch for lifting the right aileron will continue in operation to raise the aileron to roll the ship if the pulse is of sufficient duration. As the aileron moves higher the trim tab through the parallelogram linkage shown in Fig. 3 moves with the aileron but maintains the same effectivity of the aileron in its action at any angle despite the trim tab being present. Then, when the pulse is terminated the aileron gyro clutch is released and the aileron streamlines itself to its adjusted position and the gyro goes into operation in its endeavor to maintain the ship at that attitude or tilt. However, if the pilot desires to maneuver the plane a second pulse can be sent out over the left turn radio frequency this time and the initial part of this pulse will restore the trim tab to its original trim position or streamline characteristic by taking away the quarter degree angulation and thereafter the aileron gyro clutch will lower the right aileron and right target by overriding the gyro. Once the target is righted, it will fly level under the original trim.

From this description it will be seen that if during flight operation due to the consumption of fuel or damage to the aircraft sufficient to unbalance it aerodynamically or even if aileron control is lost to the gyro servo or pilot, the pilot on the ground can see the list of the ship and tap the control stick 44 repeatedly to adjust the trim tab to restore the balance between the wings and fly the drone on tab control alone. Thus, a slightly damaged drone can be used repeatedly and continuously where without the trim tab and control it would crash.

Although the timing of the time-delay-break relay 96 and 94 can be altered from a delay of .0125 second it has been found that this in combination with the trim actuation is enough to displace the trim tab approximately one quarter of a degree per signal. Moreover, the total range of movement for the tab is 28°. Thereby it is possible with approximately a hundred pulses to move the tab from one extreme to the other extreme, without danger of injury to the mechanism. In event the ship is so badly damaged that enough pulses cannot be broadcast to the ship in time to trim it against crashing, the naturalness of the pilot to pull the control stick 44 over in his endeavor to right the ship will bring in the aileron corrective action long enough to right the ship by ailerons so the pilot has more time within which to correct the trim of the ship.

Consequently it will be seen how the objects of the invention are accomplished and how various changes and modifications in the structure and relationship of the parts may be made without departing from the spirit and scope of the invention the scope of which is commensurate with the appended claims.

What is claimed is:

1. A control system for aircraft having a lifting surface with a movable airfoil mounted thereon, a source of electrical energy, a gyro servo powered from said source, a magnetic clutch means interconnecting the gyro servo and the airfoil to move said airfoil from its streaming position when actuated from said source, a trim tab hinged to the airfoil, servo means including a control linkage for varying the angle of the trim tab with respect to the angle of the lifting surface, said control linkage being carried by the wing and trim tab exclusive of said airfoil, means interconnecting said magnetic clutch means and said servo means with said source including an element responsive to an amplified radio signal for actuating said magnetic clutch means and said servo means, and means for removing said servo means from operation a predetermined short period of time after said element has been energized by a radio signal of appreciable duration.

2. In a control system for aircraft having a lifting surface with a movable airfoil mounted thereon, a trim tab pivoted to the airfoil, servo means for varying the angle of the trim tab with respect to the angle of the lifting surface including a control linkage carried solely by the lifting surface and connected to the trim tab, means for moving the airfoil, means responsive to an amplified radio signal for actuating said servo means and airfoil moving means, and means including a time delay relay for removing the airfoil moving means from operation by said signal within a predetermined short period of time after said responsive means has been energized by a radio signal.

3. In a control system for aircraft having a wing the combination of a trim tab, a movable airfoil pivoted at its upper front edge to a top portion of the wing and said trim tab being pivoted to the rear edge of the airfoil, servo means for varying the angle of the trim tab with respect to the angle of the wing including a reciprocable control element interconnecting the wing and trim tab, said control element being mounted on the wing at a point spaced below the upper front edge of the airfoil and connected to the trim tab at a point below the plane of the trim tab, means for moving the airfoil, control means responsive to an amplified radio signal for actuating said servo means and airfoil moving means to move the trim tab and airfoil in opposite directions upon actuation of said servo means and said airfoil moving means by said radio signal, and means for removing said servo means from operation a predetermined short period of time after the control means has been energized by such radio signal.

4. In a control system for aircraft having a wing with a movable airfoil mounted thereon, a trim tab pivoted to the airfoil, means for varying the angle of the trim tab with respect to the angle of the wing including a motor and a linkage driven by said motor interconnecting said wing and trim tab, means responsive to an amplified radio signal for actuating the airfoil, second means responsive to the same amplified radio signal for energizing said motor from said source to drive said linkage, and means for removing said angle varying means from operation a predetermined short period of time after said motor has been energized by said radio signal, irrespective of its duration, including a time delay relay.

5. In a control system for aircraft having a wing with a movable airfoil thereon, a trim tab hinged to the airfoil, a reversible motor means for varying the angle of the trim tab with respect to the angle of the wing including a connecting element carried solely by the wing and pivotally connected exclusively to the trim tab at a point spaced from the plane of the trim tab, servo means for moving the airfoil, means for actuating said motor means and servo including a source of electrical power and an element responsive to an amplified radio signal connecting said motor means and servo to said power, and means for disconnecting said motor means from said power within a fraction of a second after said motor means is actuated irrespective of the duration of said radio signal.

6. In a control system for aircraft having a wing with a movable airfoil thereon, a trim tab hinged to the airfoil, a source of polarized electrical energy, a reversible electric motor means for varying the angle of the trim tab with respect to the angle of the wing including a connecting element supported by the wing and directly connected pivotally to the trim tab at a point spaced from the plane of the trim tab, polarity reversing means interconnecting said motor and said source for controlling the reversible motor, an electrically energized servo means for moving the airfoil, means responsive to an amplified radio signal for actuating said polarity reversing means and said servo means, and means for disconnecting said polarity reversing means from said source within a fraction of a second after said reversible motor means is actuated including a time delay relay.

7. In an aircraft the combination of a wing, an aileron pivoted to the wing, a trim tab pivoted to the trailing edge of the aileron, a reversing motor and gear mechanism including a reciprocating member and linkage for moving said trim tab, gyro servo means for operating said aileron, means responsive to an amplified radio signal for actuating said motor and servo, said motor being operative immediately with the beginning of the signal and means for terminating the operation of said motor within a fraction of a second after its actuation.

8. In a control system for drone aircraft the combination of a radio sending set for broadcasting a signal over either one of two frequencies, a receiving set carried by the drone capable of receiving signals over both frequencies, relay means controlled by said receiving set for signals received on one of the frequencies, a second relay means controlled by said receiving set for signals received on the other frequency, an aileron carried by the wing of the aircraft, a trim tab carried by the aileron, a prime mover, means driven by said prime mover and controlled by one of the relay means for moving the aileron in one direction, means driven by said prime mover and controlled by the second relay means for moving the aileron in the opposite direction, a second prime mover, means driven by said second prime mover and controlled by said one of the relay means for moving the trim tab in a direction opposite to said one direction of movement of the aileron, means driven by said second prime mover and controlled by the second relay means for moving the trim tab in a direction opposite to said opposite direction of movement of the aileron, and means for interrupting the operation of said second prime mover a fraction of a second after either one of the relay means has been actuated.

9. In a control system for drone aircraft the combination of a radio sending set having a control stick for broadcasting a signal over either one of two frequencies, a receiving set carried by the drone capable of receiving signals over both frequencies, relay means controlled by said receiving set by signals received on one of the frequencies, a second relay means controlled by said receiving set by signals received on the other frequency, an aileron mounted on the wing, a trim tab carried by the wing, means controlled by one of the relay means for moving the aileron in one direction a fraction of a second after said relay means is actuated, means controlled by the second relay means for moving the aileron in the opposite direction, means controlled by said one of the relay means for moving the trim tab in a direction opposite to said one direction of the movement of the aileron immediately upon actuation of the relay means, means controlled by the second relay means for moving the trim tab in a direction opposite to said opposite direction of movement of the aileron immediately upon actuation of the second relay means, and means for removing both means controlled by said second relay means from operation a fraction of a second after said second relay means is actuated.

10. A control system for aircraft having a lifting surface with a movable airfoil mounted thereon and a trim tab pivoted to the airfoil, a source of polarized electrical energy, a gyro servo means powered from said source, magnetic clutch means interconnecting said gyro servo means and said airfoil to raise the airfoil when actuated, a second magnetic clutch means interconnecting said gyro servo means and said airfoil to lower the airfoil when actuated, reversible servo means, linkage interconnecting said reversible servo means and the trim tab to lower or raise the trim tab when the reversible servo means is energized, a radio sending set for broadcasting a signal over either one of two frequencies, a receiving set carried by the aircraft capable of receiving signals over both frequencies, relay means controlled by said receiving set for the duration of the signals received on one of the frequencies, a second relay means controlled by said receiving set for the duration of the signals received on the other of the two frequencies, said one relay means actuating the first magnetic clutch means and said reversible servo means from said source with a polarity which rotates the reversible servo means to lower the trim tab, said second relay means actuating said second magnetic clutch means and said reversible servo means from said source with an opposite polarity which rotates the reversible servo means to raise the trim tab, and means for disconnecting said reversible servo means from said source within a fraction of a second after said reversible servo means is energized irrespective of the duration of either radio signal.

References Cited in the file of this patent

UNITED STATES PATENTS

| Re. 16,181 | Hammond | Oct. 6, 1925 |
| 1,522,883 | Hammond | Jan. 13, 1925 |
| 1,568,974 | Hammond | Jan. 12, 1926 |
| 1,924,857 | Hodgman | Aug. 29, 1933 |
| 2,546,555 | Meredith et al. | Mar. 27, 1951 |
| 2,568,719 | Curry | Sept. 25, 1951 |
| 2,594,326 | MacCallum | Apr. 29, 1952 |
| 2,603,434 | Merrill | July 15, 1952 |
| 2,620,148 | Baring-Gould et al. | Dec. 2, 1952 |
| 2,620,150 | Atwood et al. | Dec. 2, 1952 |
| 2,626,114 | Alderson | Jan. 20, 1953 |

FOREIGN PATENTS

| 227,489 | Great Britain | Jan. 9, 1925 |
| 542,944 | Great Britain | Feb. 3, 1942 |